US007385500B2

(12) United States Patent
Irwin

(10) Patent No.: US 7,385,500 B2
(45) Date of Patent: Jun. 10, 2008

(54) SYSTEM AND METHOD FOR EFFECTUATING THE ACQUISITION AND DISTRIBUTION OF TRACKING DATA ON MOBILE ASSETS, INCLUDING SHIPMENT CONTAINERS USED IN FREIGHT TRANSPORTATION

(75) Inventor: Charles F. Irwin, Guilford, CT (US)

(73) Assignee: IGIT Enterprises, Inc., Guilford, CT (US)

( * ) Notice: Subject to any disclaimer, the term of this patent is extended or adjusted under 35 U.S.C. 154(b) by 397 days.

(21) Appl. No.: 11/058,628

(22) Filed: Feb. 16, 2005

(65) Prior Publication Data

US 2006/0192673 A1 Aug. 31, 2006

(51) Int. Cl.
*G08B 1/08* (2006.01)

(52) U.S. Cl. ................ 340/539.13; 340/992; 340/5.72; 340/431; 455/561

(58) Field of Classification Search ........... 340/539.13, 340/992, 988, 994, 539.1, 539.22, 5.72, 431; 455/456.1, 456.6, 561
See application file for complete search history.

(56) References Cited

U.S. PATENT DOCUMENTS 5,513,111 A * 4/1996 Wortham ................. 455/456.2
5,691,980 A * 11/1997 Welles et al. ............... 370/316
5,917,405 A * 6/1999 Joao ...................... 340/426.17
5,917,433 A * 6/1999 Keillor et al. .............. 340/989
5,959,568 A * 9/1999 Woolley ...................... 342/42
6,502,030 B2 * 12/2002 Hilleary ...................... 701/207
6,873,909 B2 * 3/2005 Borugian .................... 701/213
6,904,359 B2 * 6/2005 Jones ......................... 701/204
7,088,229 B2 * 8/2006 Johnson ...................... 340/505
7,138,913 B2 * 11/2006 Mackenzie et al. .... 340/539.13
7,212,829 B1 * 5/2007 Lau et al. ................ 455/456.1

* cited by examiner

*Primary Examiner*—Daryl C Pope
(74) *Attorney, Agent, or Firm*—Dilworth IP, LLC

(57) ABSTRACT

A method and system for effectuating the optimum configuration of a duplex tracking device used to track the location and attributes of a mobile asset during a discrete event and the distribution of the data reported by the device so that the owner of the mobile asset and one or more of the owner's business partners can contemporaneously access the tracking data that they require. Each party first specifies a minimum configuration for all events with which they are associated, and then optionally specifies more extensive configurations for classes of discrete events. The owner may also constrain the data that partners can request by specifying access authorities for each class of business partners. The configuration parameters for a discrete event are systematically determined to minimize the data to be reported by the device while still meeting the requirements of all the parties, as constrained by the access authorities. Each party may then view and edit, as desired, the configuration until it is frozen prior to satellite transmission to the tracking device. The apparatus includes an internet-based program tool by which any participant can contemporaneously participate in the specification of the configuration parameters for the tracking device for a discrete event, and also access the data for events with which they are associated and generate exception reports. In a preferred embodiment, the mobile asset is a shipment container used to transport freight by ocean, rail, or road, the tracking device reports via satellite communications, the discrete event is a single shipment of goods from a origin location to a destination location, and the parties include the owner of the mobile asset (carrier), the owner of the contents (shipper), the receiver (consignee), and relevant logistics providers and regulatory agencies.

35 Claims, 7 Drawing Sheets

SYSTEM AND METHOD FOR EFFECTUATING THE ACQUISITION AND DISTRIBUTION OF TRACKING DATA ON MOBILE ASSETS, INCLUDING SHIPMENT CONTAINERS USED IN FREIGHT TRANSPORTATION

BACKGROUND OF THE INVENTION (1) Field of the Invention

The present invention relates to the collaborative planning and reporting of tracking data, including location and status, for mobile assets between buyers, sellers, logistics providers, and federal agencies in a supply community, and more particularly to a method and system by which the seller (shipper), buyer (consignee), logistics providers (carriers; warehousing providers; and freight, customs, and insurance brokers), and federal agencies (U.S. Bureau of Customs and Border Protection (CBP) and U.S. Department of Transportation) can collaboratively plan the reporting of required tracking data for an individual shipment container equipped with a mobile asset tracking device and simultaneously access reports of the location and status of the individual shipment container.

(2) Description of Prior Art

The technology and services available to track mobile assets has advanced dramatically in just the last few years. Commercially available devices are now capable of monitoring many attributes of a shipment container or trailer, such as its location via Global Positioning System (GPS), route compliance, velocity (speed and direction), content volume, temperature, and evidence of tampering (door and seal status). These devices can be configured to "wake up" on a programmed interval and report this data via satellite during transit. Or, the device can be programmed to report only upon the occurrence of a specific event, such as hook-up, movement (start/stop), departure/arrival from a specified location, or crossing the pre-determined boundary ("geo-fence") around the route. The data received by the satellite is processed by a "tracking service provider", who then makes the resultant information available to the owner of the asset, typically via web access.

So-called duplex devices are now available. These devices can not only transmit tracking data, they can also receive new command instructions. So enabled, the tracking service provider can remotely re-configure a duplex device by transmitting new command instructions to it via satellite, changing, for example, its reporting frequency, wake-up conditions, or the data to be reported.

These devices are beginning to penetrate the North American truckload transportation marketplace as the technical and commercial utility improve with increased battery life (up to 5 years) and lower unit costs (about $400). About 2 to 3% of detachable trailers (100,000 of 3 to 5 million) are now equipped with satellite sensors. Early adopters report that the cost is justified by several operational benefits, such as improved customer service, increased asset utilization, and reduced losses. They now have improved information about the location of a trailer, and can provide more timely and accurate information about the expected time of arrival to the shipper or consignee. Accurate location information on every trailer allows the carrier to optimize the positioning of those trailers, thereby increasing trailer turns and asset utilization. Also, the unauthorized movement of a trailer (via the start/stop sensor or a tractor identification system) enables the carrier to immediately notify the appropriate authorities that a trailer theft is in progress. This increases the likelihood of recovering the trailer before its contents are removed.

The potential of these devices to contribute to homeland security is receiving considerable attention. For example, if the door sensor on an ocean container indicated possible tampering, then that container could be flagged as high risk and diverted for inspection. This would enable the CBP to adopt a targeted approach to border security, better utilizing their limited resources. For domestic rail and road shipments, the receiving location could similarly flag a container as high risk if the door had been opened while en route or if the trailer had breached the pre-determined geo-fence and take appropriate action.

These significant operational and security benefits suggest that mobile asset tracking technology ought to become standard business practice. Furthermore, as usage increases, the scale efficiencies in the manufacture of the sensor and the transmission and processing of the data can be expected to substantially reduce costs, dramatically accelerating adoption and penetration. Some believe that the cost/benefit profile will become so compelling that the federal government might even mandate the tracking of all shipment containers. But, even when the cost to track a shipment does decline to less than $0.50 per shipment (or 0.05% of the average transportation cost for a truckload shipment), a $250 mm annual cost increase in such a low-margin industry will certainly be contested.

The commercial utility of mobile asset tracking is presently constrained by the following three limitations. Overcoming these limitations will dramatically enhance the commercial feasibility of mobile asset tracking, and thereby ensure an essential role for this technology in ensuring the security of global commerce.

Information Visibility: Presently, only the owner of the asset (the carrier, in the application of freight transport) has real-time access to the tracking data on the mobile asset. Other users—such as the buyer/consignee and seller/shipper, the shipping and receiving warehouse locations, and the freight broker—do not have real-time access. They must contact the owner of the asset (by calling or accessing their website) for an update. Other potential users of the shipment position and status information—such as customs broker, the CBP agents, or the insurance companies that insure the mobile asset or its contents—do not have any ready access to the information, even though they might desire to have access or might benefit from having such access. The simple consequence of the current data distribution model—that the tracking data is directly available only to the party that owns the mobile asset—is that the asset owner is burdened with the role of distributing the data to the other parties who have a need to know the information, be it by phone or web access. In transportation, this results in significant complexity and costs as each carrier must establish a means by which each of their direct business partners (shipper, consignee, and broker) can access the information. Even then, indirect users (customs broker, CBP, and the insurance broker) may still not have ready access to the information. Each user will have to deal with the complexity of accessing many sources to obtain their information, which will frustrate attempts to automate the process of acting on the information (collection and analysis of the data, and identification and management of the exceptions). The result, of course, is that much of the data will never be effectively utilized, and in time be viewed as a nonvalue added expense. Rather, the tracking data must be made available, in real-time, to all parties that have a need to know the information, via a universal and easy-to-use reporting tool. Each party must be able to access all their business data in this reporting tool, for all of their business relationships.

Reporting Instruction Optimization: Presently, only the tracking service provider and the owner of the mobile asset can re-configure a tracking device. The owner, of course, can re-configure the device (simplex or duplex) by directly downloading new command instructions. This is typically done using a hand-held device that is hard-wired to the device. Duplex devices can be re-configured remotely by the tracking services provider, by transmitting the new command instructions via the satellite communication. The owner cannot, therefore, directly re-configure the device, but rather must provide the new command instructions to the tracking service provider. This arrangement renders it impracticable to frequently update the command instructions so as to optimize the data capture as appropriate for the real information needs of a discrete event, such as a freight shipment. For example, the geo-fence route compliance feature might be activated for trailers moving on high-risk routes. Or, the reporting frequency might be increased for shipments that are time-critical. Or, when the trailer is being moved empty, all reporting except for "departed origin" and "arrived destination" might be de-activated to extend battery life and minimize transmission costs. Even if it were practicable for the owner and the tracking service provider to update the reporting instructions for each tracking device for each discrete event, they would be doing so without input from the other parties that have a need for tracking data for that shipment. The risk, of course, is that the reporting instructions are then sub-optimized basis the needs of the owner only, with less than adequate consideration of the needs of the other parties. These limitations ultimately result in one of two outcomes. Either the owner collects "as much data as possible", to reduce the risk of not meeting the information needs of the other parties, resulting in too much data, higher than needed operating costs, and reduced battery life or the owner optimizes the reporting rules against his own needs, and misses an opportunity to satisfy high-value needs of his business partners. Clearly, a solution that enables all business partners to collaborate in the selection of the reporting rules, for each tracking device on an event-by-event basis, is required to optimize the value of tracking the mobile asset.

Cost Attribution and Allocation: The first two limitations necessarily saddle the owner with the economic burden of the tracking technology. Insofar as the other parties do not have direct visibility to the tracking data and cannot influence the reporting instructions that control the data acquisition, it is difficult, if not impossible, to charge them for the information. Rather, the owner must recover their costs indirectly, by either increasing their rates (justified by improved customer service) or reducing their costs (via improved asset utilization). There is, therefore, a significant missed opportunity. The other parties—such as shipper, consignee, broker, custom broker or agent, or insurance agent in freight transportation—may well_be willing to pay a fair price for the tracking data, especially if it was his needs that controlled in the determination of the reporting configuration of the mobile asset for a particular event. For example, an insurance company might find significant value in being able to ensure that the geo-fence capability was enabled for every shipment moving in a particular lane or geography. The tracking costs for a particular shipment (above the carrier default) could then be attributed to the party whose requirements controlled in the determination of the configuration parameters. Without such a capability, the cost for a new technology that benefits an entire industry will be borne by a single group in the industry.

Presently, there are no commercially available and practicable solutions that overcome these barriers and limitations. Consequently, the adoption rate of a break-though technology will be constrained. Clearly, these limitations must be overcome to maximize the potential of mobile asset tracking technology to improve service, reduce costs, and reduce risk, and it to this end that the present invention is directed.

BRIEF SUMMARY OF THE INVENTION

The present invention is a method and apparatus for effectuating the optimum configuration of an electronic device used to track a mobile asset during a discrete event and the distribution of the data reported by the device and any information derived from the data so that each of the parties can contemporaneously access the tracking data and information required by said party.

The present invention enables the determination of the configuration parameters for the electronic device so as to minimize the data reported by the device during a discrete event while still satisfying the tracking data requirements of each party. Each party may specify default data requirements list describing the tracking data attributes and frequency of reporting, such as: loaded time (time stamp when door is closed and sealed at origin GPS location, event initiation); power hook-up (GPS location, time stamp, and identification number or power unit hooking up to an un-powered mobile asset); volume of contents (last reported, event minimum and maximum for mobile assets that contain goods); last reported GPS location and direction; speed (last reported, event average and max); route compliance violation (any geo-fence violation location and time stamp); stop history (location of last reported, duration, and time stamp; event stop count and cumulative stop time); temperature history (last reported temperature; time stamp, duration, and min or max of any excursions exceeding pre-set min or max limits); unauthorized container entry history (GPS location and time stamp if door is opened or seal is broken anywhere except destination); potential late delivery (if ETA calculated from remaining drive time is after delivery appointment time, road only); delivery arrival (destination GPS position and time stamp); container opened (time stamp when door is opened or seal is broken at destination location); container empty (time stamp when volume of contents is zero at destination location, event conclusion); and frequency of reporting (time period in 1 hour increments, or on specified events including loading, unauthorized hook-up, pick-up departure, route compliance violation, temperature excursion, stops, unauthorized container entry, container opened, or container unloaded).

Each party first specifies a minimum setting that applies to all of their events. Each party may then, if desired, specify more extensive settings for classes of discrete events as defined by event descriptor attributes including commodity type (SIC code); shipper, carrier, or consignee ID; container type; mode (ocean, rail, or road); route (origin and destination ship locations); and shipment type (domestic, import, or export). The configuration parameters for the tracking device are then selected for each event basis these default settings so as to minimize the data to be reported by the device while still meeting the requirements of all the parties. Each party may then over-ride this selected configuration parameter by selecting a more demanding setting for that single event. The final configuration parameters are then communicated to the tracking device.

During the event, the tracking device monitors the location and status of the mobile asset, but reports only the data and information required by the configuration parameters. The data is posted to a many-to-many website where all parties can contemporaneously access the data and information for any and all events for which they have a need-to-know the tracking data. Each party may look-up tracking data for a specific event, or they may generate exception reports that list all events that satisfy event description attributes or tracking data attributes and values selected by the user. Each owner can assign access authorities to each partner that may limit the tracking data that the partner is able to access.

In a preferred embodiment, the mobile asset is a shipment container used to transport freight by ocean, rail, or road, the tracking device reports via satellite communications, the discrete event is a single shipment of goods from a origin location to a destination location, and the parties include the owner of the mobile asset (carrier), the owner of the contents (shipper), the receiver (consignee), involved logistics providers (freight broker, customs broker), and regulatory agencies (CBP, police), and an internet-based program tool is used to facilitate the determination of the configuration parameters for the tracking device and to present the data and information so that all parties may contemporaneously view the data that they require for each event or group of events.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting there from that do not depart from the spirit and scope of the present invention. The application is neither intended to define the invention of the application, which is measured by its claims, nor to limit its scope in any way.

Thus, the objectives of the invention set forth below, along with the various features of novelty which characterize the invention, are noted with particularity in the claims annexed to and forming a part of this disclosure. For a better understanding of the invention, its operating advantages and the specific results obtained by its use, reference should be made to the following detailed description taken in conjunction with the accompanying drawings wherein like characters of reference designate like parts throughout the several views.

The drawings are included to provide a further understanding of the invention and are incorporated herein and constitute a part of the specification. They illustrate embodiments of the invention and, together with their description, serve to explain the principles of the invention.

DETAILED DESCRIPTION OF THE INVENTION

Figure 1:
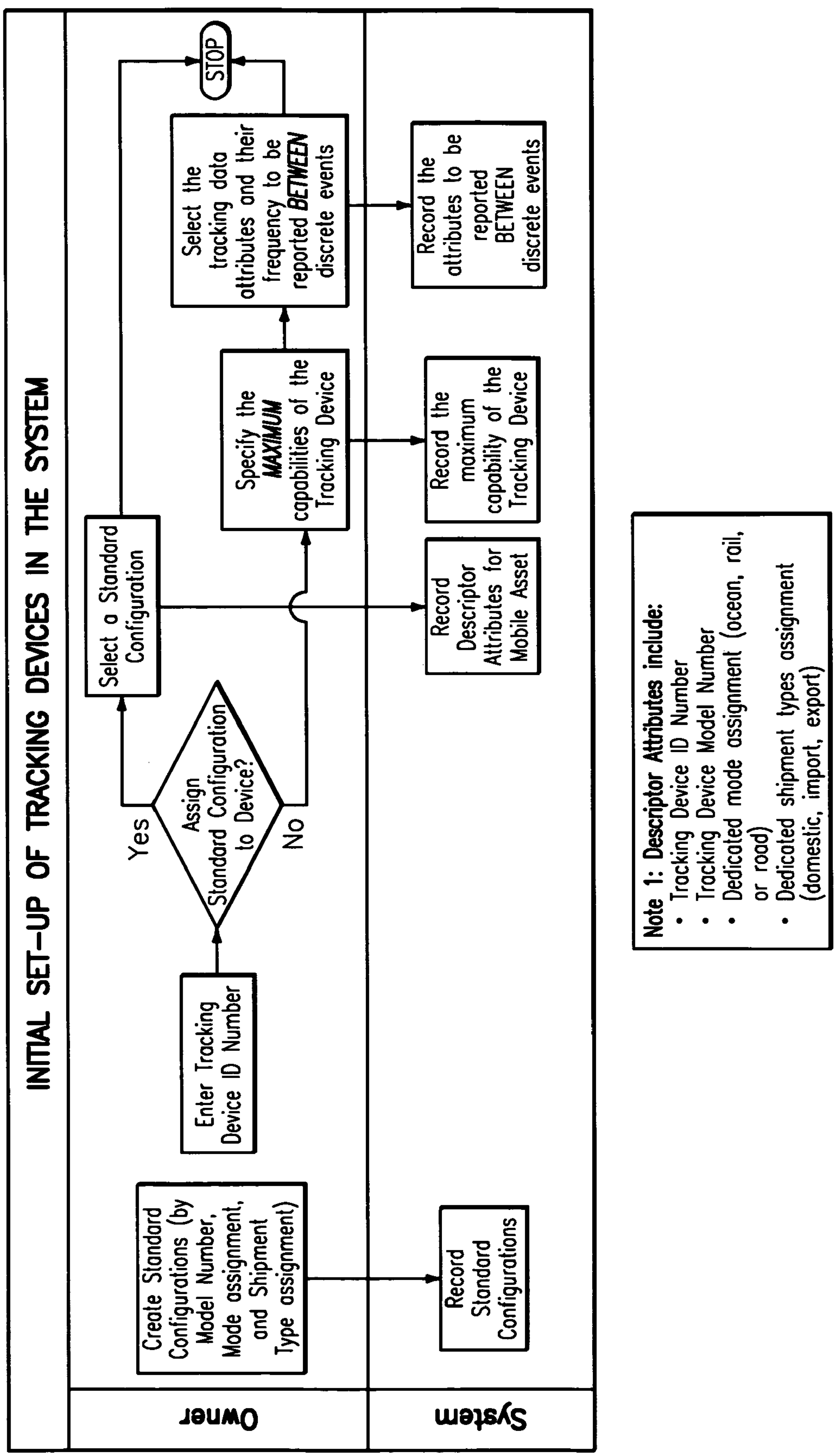
FIG. 1 illustrates the method by which the Owner specifies in the system i) the mobile asset descriptor attributes for the tracking device [mobile asset ID Number, dedicated mode assignment (ocean, rail, or road), dedicated service area assignment (region), or dedicated shipment type assignment (domestic, import, or export], ii) the maximum list of tracking data attributes and their reporting frequency that each tracking device is capable of acquiring and reporting, and iii) the list of tracking data attributes and reporting frequency that each tracking device is to provide between discrete events, and the Owner may then create more specific lists and assign a list to one or more mobile assets in a single class of mobile assets as defined by the mobile asset descriptor attributes.
Figure 2:
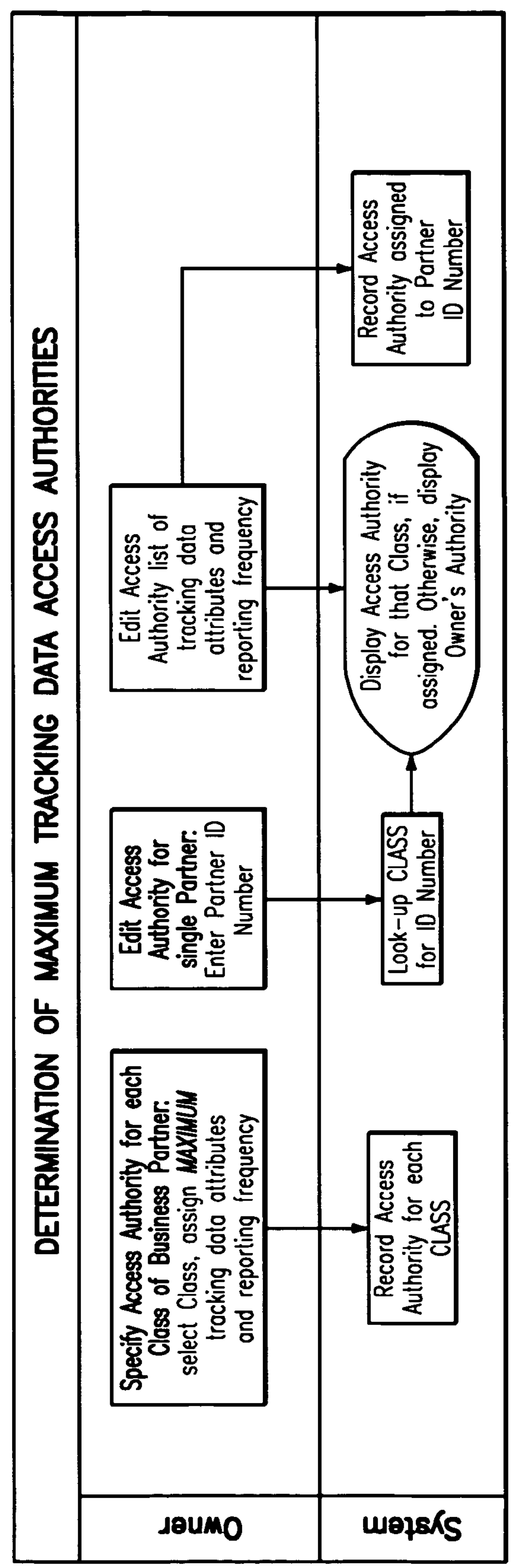
FIG. 2 illustrates the method by which the Owner specifies, for each class of business partners, a list of the maximum tracking data attributes and frequency to which that class of business partners is authorized, and then specifies more specific lists and assigns said more specific list to one or more members of a single class of business partners, the default authority is identical to the Owners authority.
Figure 3:
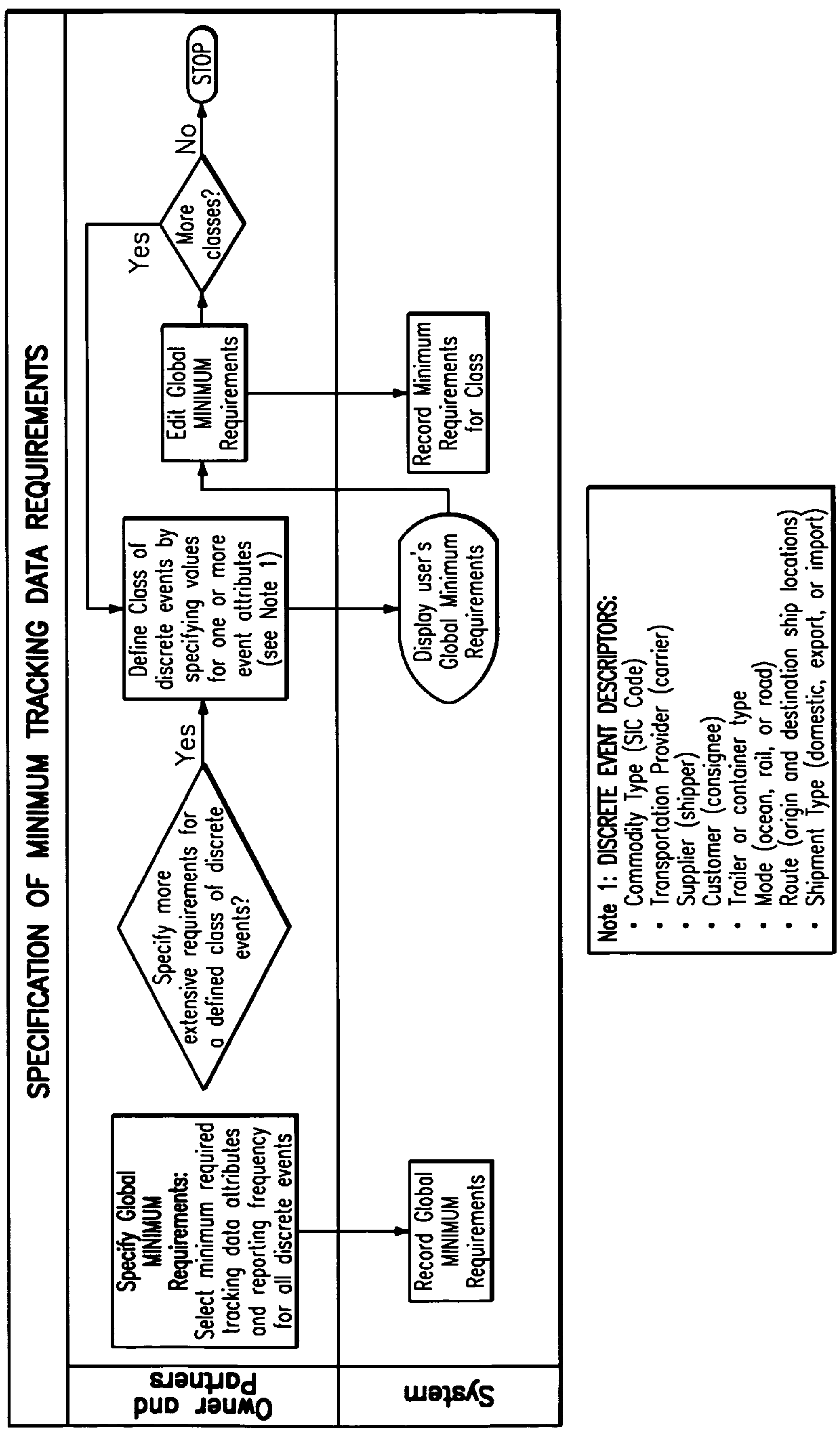
FIG. 3 illustrates the specification of the tracking data requirements wherein (i) each of the parties (Owners and Partners) may specify, at their discretion, the minimum tracking data requirements to be reported by all tracking devices on mobile assets during discrete events associated with that party, and (iii) each of the parties (Owners and Partners) may specify, at their discretion, tracking data requirements that are more extensive than the minimum tracking data requirements to be reported by tracking devices for classes of discrete events as determined by any combination of commodity type (SIC code), transportation provider (aka carrier), supplier (aka shipper), customer (aka consignee), trailer or container type, mode (ocean, rail, or road), route (origin and destination ship locations), and shipment type (domestic, import, or export), and the default specification is the capabilities of the tracking device.
Figure 4:
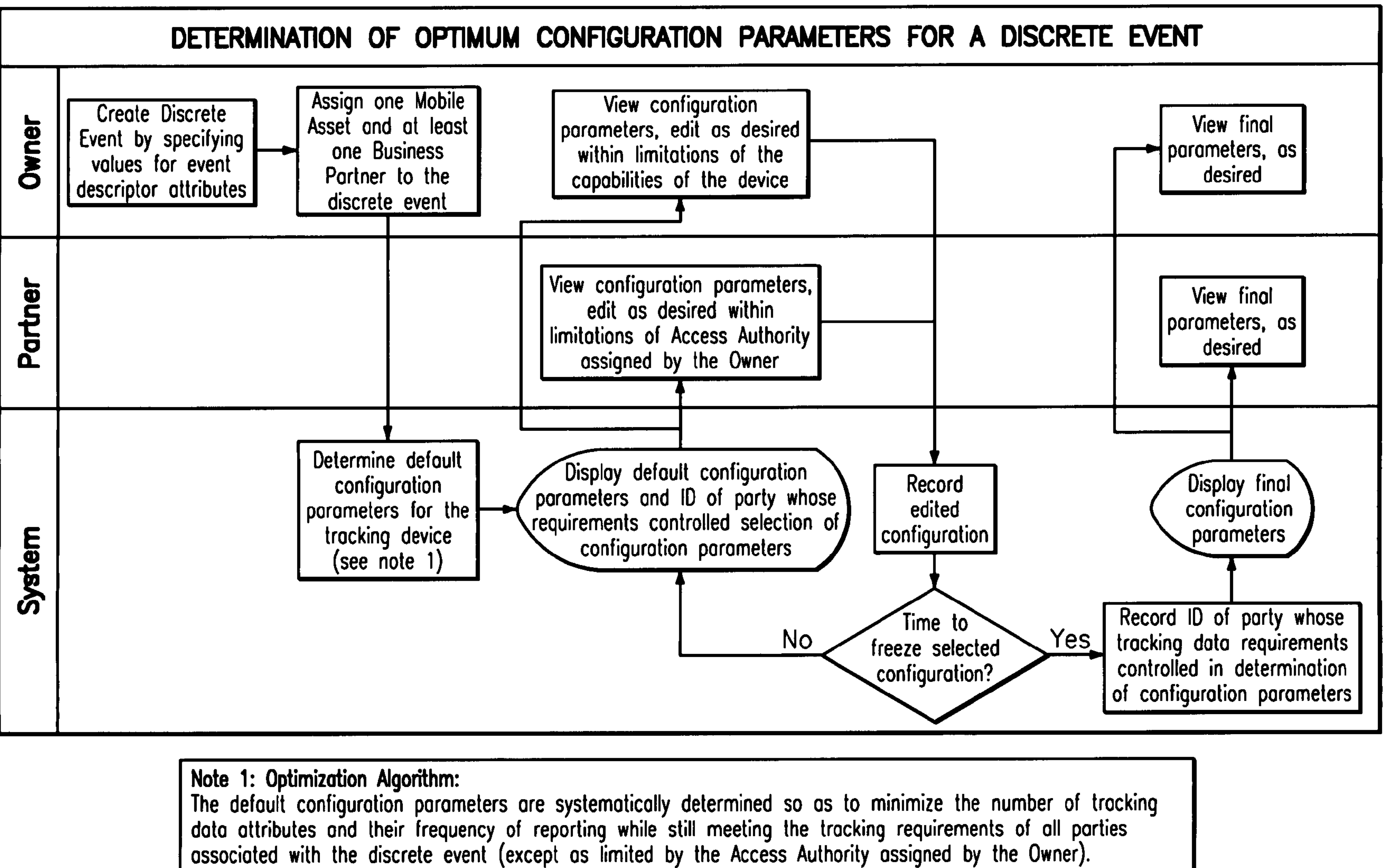
FIG. 4 illustrates the determination of the configuration parameters for a tracking device for a discrete event wherein (i) a discrete event is defined using descriptor or time attributes useful for differentiating between discrete events, (ii) a mobile asset equipped with a tracking device, one Owner, and at least one Partner are associated with the discrete event, (iii) the default configuration parameters for a specific tracking device to be used during said discrete event are determined so as to minimize the data and information reported by the tracking device while still meeting any and all default tracking data requirements specified by each of the parties associated with a discrete event except as limited by the capabilities of the tracking device or the access authorities assigned by the Owner, (iv) the ID of the party whose tracking data requirements controlled in the determination of the configuration parameters for that event is recorded, (v) each of the parties associated with a discrete event may view, at their discretion, the determined optimum configuration parameters for the discrete event, (vi) each of the parties may over-ride, at their discretion, the optimum configuration for a selected discrete event until such time as the optimum configuration is frozen prior to transmission to the tracking device by specifying a more extensive set of data and information to be applied to the discrete event, (vii) the configuration parameters for a specific tracking device to be used during a discrete event are then revised accordingly as in (iii) to meet the more revised tracking data requirements, and (viii) the ID of the party whose tracking data requirements controlled in the determination of the configuration parameters for that event is revised, as necessary, and recorded.
Figure 5:
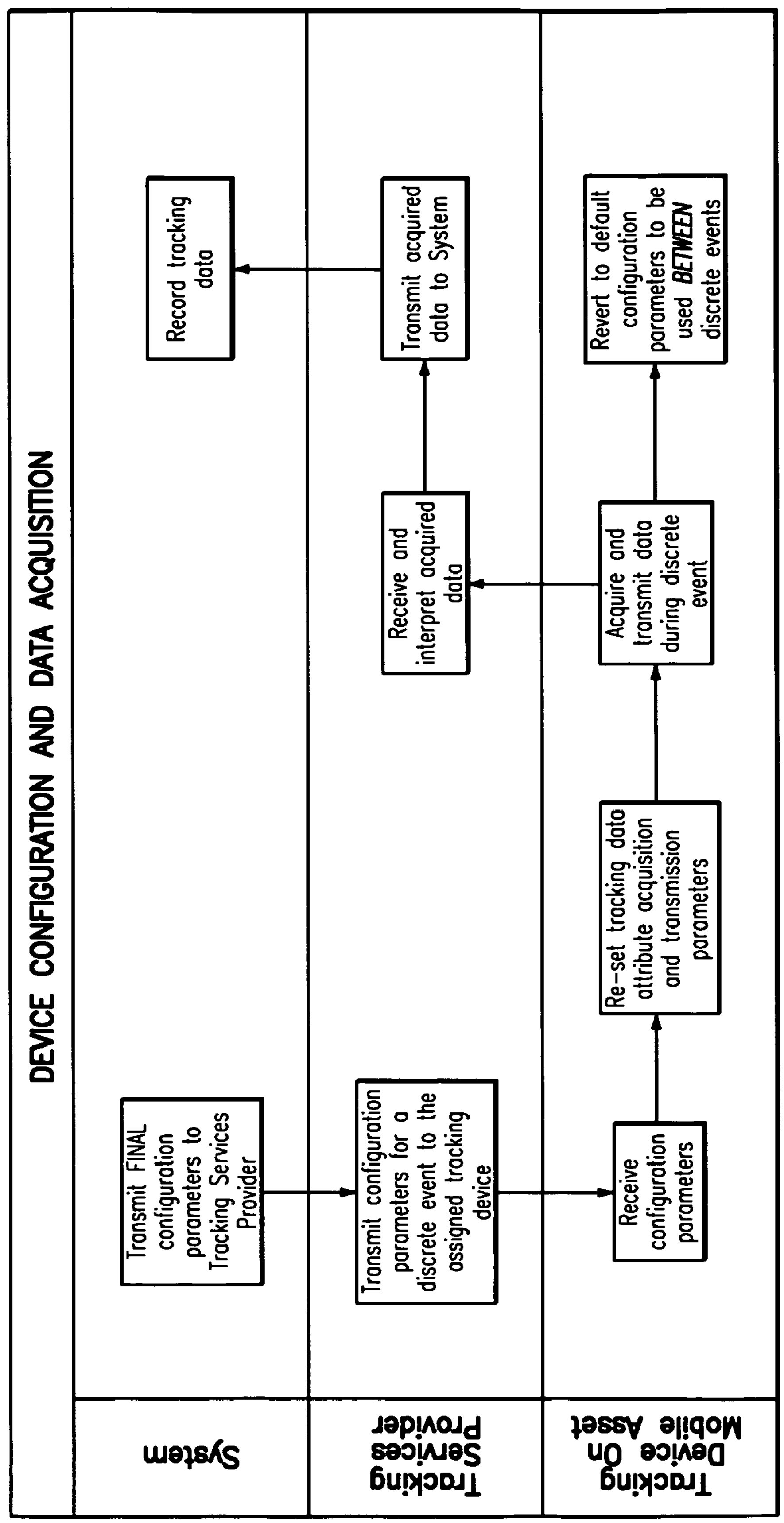
FIG. 5 illustrates the re-configuration of at least one tracking device for at least discrete events wherein (i) the configuration parameters for one or more tracking devices are frozen and then wirelessly communicated (in real-time or batch-wise) to the corresponding tracking devices, (ii) the tracking device reports the location and status attributes of the mobile asset and its contents during the discrete event as required by the configuration parameters, and (iii) at the conclusion of the event, the tracking device automatically reverts to the default configuration parameters to be used between discrete events.
Figure 6:
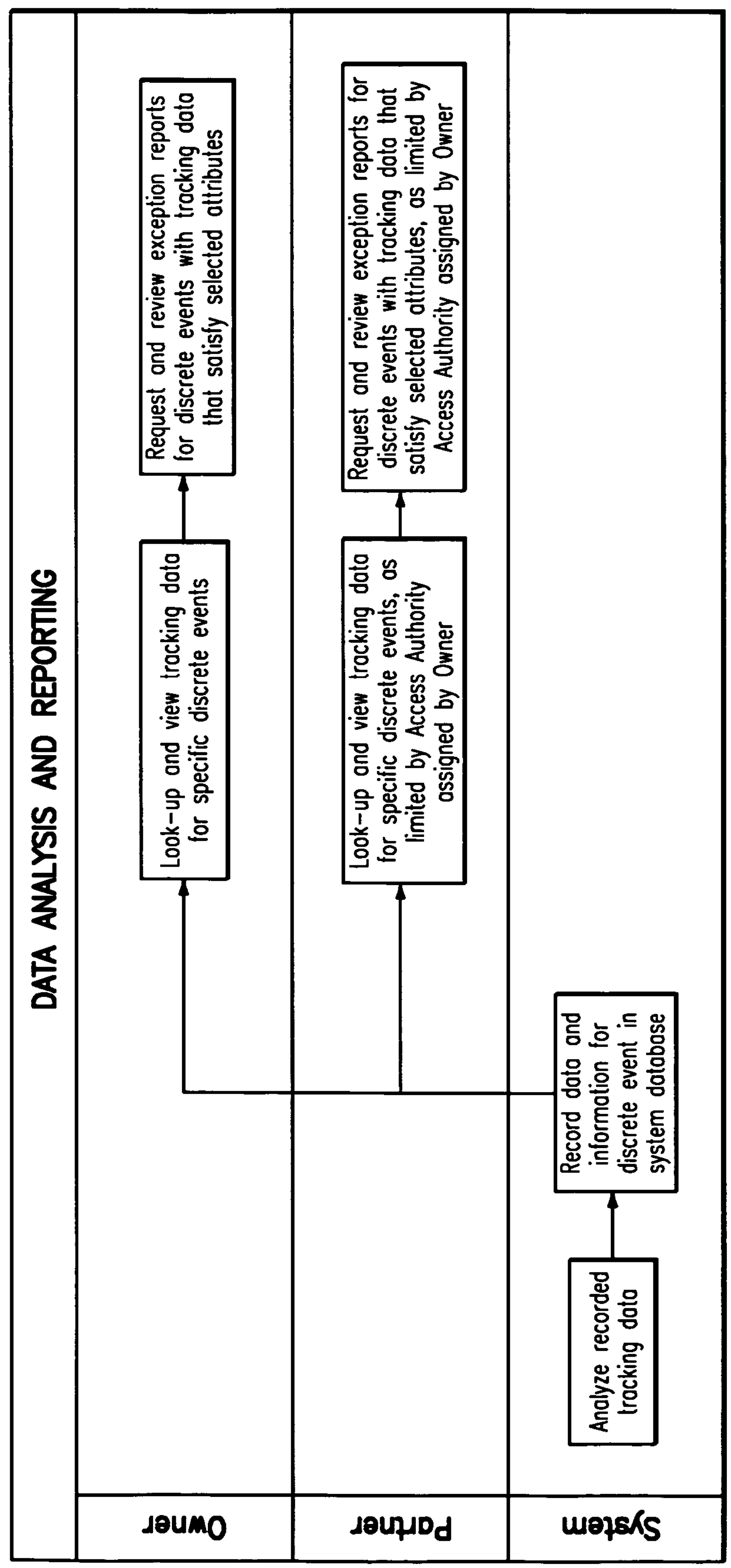
FIG. 6 illustrates the analysis of the acquired data and the presentation of the data and information wherein (i) location and status data for each discrete event is systematically analyzed, (ii) the analyzed data and information is recorded in a system database, (iii) each of the parties may contemporaneously search-out, look-up, or otherwise access and view, at their discretion, the tracking data and information for specific discrete events, be they in progress or complete, associated with said party, and (iv) each of the more than one parties may contemporaneously generate exception reports that list all discrete events associated with said party that satisfy event description attributes or data and information attributes selected by that party.
Figure 7:
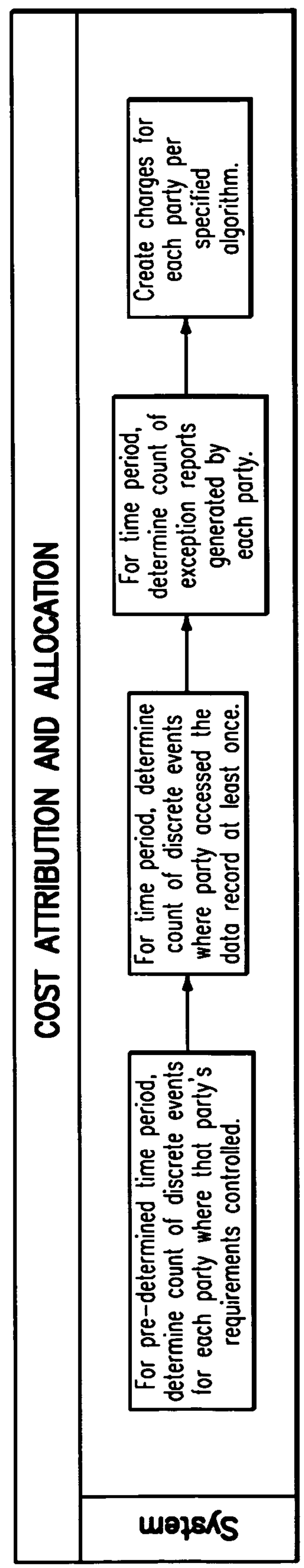
FIG. 7 illustrates the attribution and allocation of the costs associated with the acquisition, analysis, and presentation of position and status data acquired from tracking devices on mobile assets wherein (i) for each of the parties, the following information is determined and recorded for a set period of time: (a) the count of discrete events for which that party's data requirements controlled in the determination of the configuration parameters for that event, (b) the count of discrete events for which that party accessed the data record for that discrete event at least once, (c) the count of exception reports generated by that party and (ii) each party is charged proportionately to the count of events with which they are associated relative to the total count of events.

A party that owns, leases, or otherwise controls mobile assets ("Owner") and desires to utilize the present invention to facilitate the optimum configuration of the electronic tracking devices on their mobile assets and to distribute the tracking data and information acquired from these tracking devices first sets-up each device in the system by specifying descriptor attributes that enumerate the identification information and intended use of each device. The Owner then specifies the capabilities of each tracking device by entering the maximum tracking data attributes and frequency that the tracking device is capable of reporting. The Owner can specify a less extensive list of tracking data attributes and frequency to be reported by the device between discrete events when only the Owner needs to know the tracking data for the mobile asset. This extends the life of the battery and reduces the cost of maintaining each tracking device. Some tracking devices can be manually pre-configured to "go silent" between discrete events, in which case it is not necessary for the Owner to specify a "between events" reporting configuration. The default configuration of a device may be changed at anytime by the Owner.

Tracking data attributes of interest to parties practicing this invention in freight transportation applications, such as truck trailer or shipment container tracking, comprise: loaded time (time stamp when door is closed and sealed at origin GPS position, event initiation); power hook-up (GPS location, time stamp, and identification number or power unit hooking up to an un-powered mobile asset); volume of contents (last reported, event minimum and maximum for mobile assets that contain goods); last reported GPS location and direction; speed (last reported, event average and maximum); route compliance violation (any geo-fence violation location and time stamp); stop history (location of last reported, duration, and time stamp; event stop count and cumulative stop time); temperature history (last reported temperature; time stamp, duration, and minimum or maximum of any excursions exceeding pre-set minimum or maximum limits); unauthorized container entry history (GPS location and time stamp if door is opened or seal is broken anywhere except destination); potential late delivery (if ETA calculated from remaining drive time is after delivery appointment time, road only); delivery arrival (destination GPS position and time stamp); container opened (time stamp when door is opened or seal is broken at destination location; container empty (time stamp when volume of contents is zero at destination location, event conclusion); and frequency of reporting (time period in 1 hour increments, or on specified events including loading, unauthorized hook-up, pick-up departure, route compliance violation, temperature excursion, stops, unauthorized container entry, container opened, or container unloaded).

The Owner then specifies for each party that needs to know tracking data for the Owner's mobile assets (or the contents of the mobile assets) ("Partner") the maximum tracking data attributes and frequency that the Partner is authorized to request and access. The Owner has the option of assigning authorities to classes of Partners as defined by the Partner descriptor attributes. If the Owner does not specify the authority for a Partner or class of Partners, those Partners are assigned the same authority as the Owner.

This is an important feature of the invention. It allows the Owner to differentiate between Partners for security and business reasons. For example, the Owner can tailor the access authority so that each Partner can access only the tracking data for which they have a genuine need or right to access. Government agencies might be authorized to access tampering data only. Or, the Owner can differentiate between Partners in a single class by charging a premium to be able track time-critical shipments by requesting frequent reporting.

Each Partner then specifies the minimum tracking data attributes and frequency requirements to be reported by tracking devices on mobile assets during discrete events associated with that Partner. Each Partner may also specify tracking data requirements that are more extensive than the minimum data requirements to be reported by tracking devices for classes of discrete events as determined by any combination of commodity type (SIC code), transportation provider (aka carrier), supplier (aka shipper), customer (aka consignee), trailer or container type, mode (ocean, rail, or road), route (origin and destination ship locations), and shipment type (domestic, import, or export). These minimum requirements can be changed at anytime by the owner.

This aspect of the invention allows each party (Owners and Partners) to establish a default minimum level of reporting to be applied to all events with which they are associated. But, a party can then step-up the level of reporting for selected classes of events. As before, this aspect of the invention allows the party to establish a level of reporting that is tailored for the need to minimize transmission and data management costs and to extend the battery life of the tracking device. Reporting for "just-in-time" shipments (identified, for example, by customer ID and destination ship location) will be more extensive than reporting for less time-sensitive shipments. Reporting for shipments moving in high-theft regions can be increased to include compliance with a specified geo-fence or evidence of tampering.

This information—maximum capabilities of the device, maximum access authority assigned by the Owner to each Partner, and the minimum tracking data requirements for each party for each class of discrete event—enables the systematic determination of the optimum configuration of the tracking device for each discrete event so as to minimize the total data quantity to be reported by the tracking device during the discrete event while simultaneously meeting the tracking data requirements of each of the parties associated with the event except as limited by the maximum capabilities of the device or by the access authorities assigned by the Owner. Each party is then afforded an opportunity to review this optimum configuration and fine-tune their tracking data requirements for that single discrete event, if they so desire, after which a new optimum configuration is immediately determined. This process may be repeated until such time as the configuration is frozen preparatory to transmission to the tracking device.

This aspect of the invention ensures that the needs of all parties that have a need or a right to know tracking data for a mobile asset during a discrete event are systematically considered when configuring the tracking device. Heretofore the Owner was responsible to configure each tracking device, with or without input from the Partners. While Owners might consider the tracking data requirements of their most important Partner, it is certainly not practicable for the Owner to consider the requirements of all Partners and then continuously optimize the configuration of each tracking device, especially for each discrete event. As a result, the configuration of tracking devices is sub-optimized and more data than is required is acquired from each tracking device, increasing costs for data management and tracking device maintenance (due to reduced battery life).

During the discrete event, the tracking device reports tracking data attributes as required by the configuration settings for the device for that discrete event. The raw data is received and analyzed, and the resultant tracking data and information is posted to a database. Owners and Partners can contemporaneously access records in the database for events with which they are associated and view data and information for which they have authority as granted by the Owner. Heretofore, the Owner was the only party with direct access to the tracking data and information. The Owner then was burdened with the task of distributing the data to the other Partners who have a need to know the information. Phone, EDI, and web access are three common means of providing the tracking data to other Partners. The invention overcomes this limitation. Now all parties can access the tracking data at the earliest possible time, and the Owner is spared the task of distributing the tracking data.

Finally, the invention makes possible the cross-enterprise allocation of the costs of tracking the mobile asset. Each time the optimum configuration is determined for a discrete event, the ID of the party whose tracking data requirements controlled in the determination of the configuration parameters for that event is recorded. This enables the attribution of the tracking costs to the party with the most demanding requirements. It also, thereby, creates an opportunity for the Owner to affect the attribution. For example, an Owner that specifies minimal tracking data requirements for its self increases the likelihood that the event would be attributed to one of the Partners. Conversely, an Owner that specifies minimal data access authorities for the Partners decreases the likelihood that the event would be attributed to the Partners. The invention also provides a means for charging each party an amount proportionate to the count of events attributed to that party.

In a preferred embodiment, the mobile asset is a shipment container used to transport freight by ocean, rail, or road, the tracking device reports via satellite communications, the discrete event is a single shipment of goods from a origin location to a destination location, and the parties include the Owner of the mobile asset (carrier), the owner of the contents (shipper), the receiver (consignee), involved logistics providers (freight broker, customs broker), and regulatory agencies (customs agents, police) (all Partners)), and an internet-based program tool is used to facilitate the determination of the configuration parameters for the tracking device and to present the data and information so that all parties may contemporaneously view the data they required for each event or group of events.

The business method process comprising the present invention can be incorporated in an internet web-site application which will enable business Partners in the truckload transportation marketplace (shippers, consignees and carriers) collaboratively to: (a) make and confirm pick-up and delivery appointments for truckload shipments, (b) track shipments, (c) record and share key transactional data, including accessorials incurred and proof-of-delivery documents, (d) measure and improve performance on key service and cost performance indicators, and (e) create and manage incentive programs that reward business Partners for meeting threshold targets on the key performance indicators.

Such an internet web-site application is preferably modular in design with each module comprised of a narrow set of related capabilities and independent of the other modules (sharing only a common administration module and an underlying data base). This modular design reduces complexity, simplifies development and maintenance, and ensures reliability.

The modular design also helps ensure that the application, and its capabilities are intuitive and easy to use, so as to encourage adoption and consistent use by all individuals. Users will also be provided data entry options—a template (enter data into fields), manual Excel file uploads (or paste and copy), and an automated transfer server-to-server—to ease integration with current systems, regardless of business practice or process.

The structure for the modules is as follows:

1. Customer Care Module

This module welcomes visitors and invited guests to the web-site, communicates the vision and program, and then provides the information that the prospective member will want and need to make a decision to join (such as site tours, sample program and reports, press releases and articles, and customer testimonials). After completing the registration process and selecting the desired services, the member is then cared for with information (news letters, bulletin board and market updates), communication tools (buttons to e-mail the administrator, submit improvement ideas or touch a partner), and training tools (frequently asked questions, learning tutorials, and Help!). Partner administrators are also able to manage their account and archive data.

2. Master Data Entry and Management Module

Each member Partner must enter and maintain its administrative data. First, the Partner designates an administrator, who then configures and assigns roles to users at that Partner. The administrator then creates a Partner list naming those Partners with whom they wish to collaborate. Each shipper and customer (consignee) must complete the ship location profile for every ship location. This profile records the information required by shippers and carriers to flawlessly plan and execute a shipment. The information is easily accessed and searched, and is maintained by the user responsible for that location. The location user configures the appointment schedule for that location in the appointment engine (for inbound and outbound shipments, as relevant). This schedule can be customized or changed to meet the needs of that location. Carriers complete a request for information survey that documents their capabilities. This information will be used by shippers to identify the carriers with the potential to offer the highest value against the shipper's needs.

3. Enter and Maintain Transactions Appointments Module

This module is the data warehouse where the data that drives the performance and incentive modules is entered and managed. Here, carriers request pick-up and deliver appointments by using the appointment engine and the location then confirms the appointment. Actuals for each shipment (against the planned appointments) are entered, by both the carrier and the location to ensure accuracy. Using an accessorial validation tool, the carrier and location independently indicate which accessorials the carrier provided while at the location. The shipper can then access or download this accessorial history to investigate discrepancies and to approve accessorials invoiced by the carrier. The carrier can scan and post proof of delivery documents for later use by the shipper to resolve deduction claims made by the customer.

4. Shipment Tracking Module

This module controls the configuration of tracking devices and provides each Partner with access to the tracking data and information acquired from said tracking devices, as governed by the capabilities of the tracking device, the access authorities assigned by the Owner, and the tracking requirements specified by each Owner and Partner.

5. Performance Module

This module is a data analysis engine that generates score card reports of the performance of each participating Partner as compared to the minimum required performance level for each key performance indicators. Users can also drill down through the data to determine the root cause of any key performance indicator deviations against the required performance level. Examples of key performance indicators are: (a) on-time by location (versus appointment), (b) power dwell time by ship location, and (c) trailer dwell times (turns) by drop location.

6. GainShare Incentive Program Creation and Management Module

In this module, member Partners can create and manage their own incentive program(s). When they do so, they become a program sponsoring Partner and commit to rewarding any participating Partner for performance that exceeds the minimum required performance level specified by the sponsoring Partner in their program(s). For example, a supplier (shipper) that wishes to reduce power dwell time at a customer's receiving location might offer that customer a reward equal to half of the carrier detention accessorial savings if that location succeeds in reducing the actual dwell time. When the improvement is realized, the payment would be issued to the customer.

7. Account Management Module

In this module, the monthly financial statement for each partner is generated and posted. Receivables are invoiced and payments are issued for earned incentives. The partner administrator can review the account and approve each credit or debit to the account.

From the proceeding description, it can be seen that a means of determining the optimum configuration of devices for tracking mobile assets and then the tracking data and information reported by the tracking devices has been provided that meets all of the advantages of prior art programs and offers additional advantages not heretofore achievable. With respect to the foregoing invention, the optimum dimensional relationship to the parts of the invention including variations in format, material, shape, form, function, and manner of operation, use and assembly are deemed readily apparent to those skilled in the art, and all equivalent relationships suggested in the drawings and described in the specification are intended to be encompassed herein.

The foregoing is considered as illustrative only of the principles of the invention. Numerous modifications and changes will readily occur to those skilled in the art, and it is not desired to limit the invention to the exact operation shown and described. All suitable modifications and equivalents that fall within the scope of the appended claims are deemed within the present inventive concept.

What is claimed is:

1. In a method for effectuating collaboration on mobile asset tracking between one or many parties that own mobile assets equipped with mobile asset tracking devices ("Owners") and one or many other parties with a need to know tracking data for at least one mobile asset or its contents for at least one discrete event ("Partners"), the method comprising the steps of:

a) at least one Owner and at least one Partner specifying the tracking data required for one or many mobile assets for one or more discrete events, wherein the mobile assets are equipped with remotely configurable mobile asset tracking devices;

b) using the specified tracking data to remotely configure the mobile asset tracking devices;

c) acquiring tracking data from the remotely configured tracking device for one or more discrete events which simultaneously minimizes the quantity of data acquired and satisfies the specified tracking data; and d) at least one Owner and at least one Partner contemporaneously accessing and viewing the specified tracking data.

2. The method as claimed in claim 1 wherein Owners includes any party or type of party that has title to, leases or otherwise controls a mobile asset equipped with a mobile asset tracking device and any party or type of party that provides or arranges for mobile asset tracking capability or services on mobile assets including asset-based transportation service providers, non-asset based transportation service providers, and private fleets.

3. The method as claimed in claim 1 wherein Partners includes any party or type of party that has a need to know tracking data for mobile assets equipped with a mobile asset tracking device including shippers, consignees, ship locations, freight brokers, third party logistics providers, fourth party logistics providers, customs brokers, freight payment service providers, risk management service providers, equipment service providers that manufactured, sold, lease, or maintains the asset, and regulatory and enforcement parties.

4. The method as claimed in claim 1 wherein the mobile asset may have self-contained power for movement and is selected from the groups of asset types comprising trucks, railroads, ships, vans, shipment containers, trailers, rail cars, shipment boxes for road, rail, or ocean service, and machinery.

5. The method as claimed in claim 1 wherein a discrete event is any continuous period between a defined initiation and termination which may be time or events.

6. The method as claimed in claim 5 wherein the discrete event is a shipment defined by the delivery of goods in a container from a ship location where the loading is complete and the container is sealed for the final time to a location where the seal is broken and unloading begins.

7. The method as claimed in claim 1 wherein an Owner can specify the data set to be provided by each mobile asset by first assigning an overall default data set for all mobile asset types, and then assigning more specific data sets for each mobile asset type with the capability to over-ride default for an individual mobile asset.

8. The method as claimed in claim 1 wherein an Owner can specify the data set that Partners can access for that Owner's mobile assets by first assigning an overall default data set for all Partners then assigning more specific data sets for each Partner type with the capability to over-ride default setting for an individual Partner.

9. The method as claimed in claim 1 wherein the Owners and Partners can specify the tracking data by first optionally specifying a data set that applies to all mobile assets for all events and then optionally specifying more specific data sets each of which applies only to mobile assets and events that meet the values specified for each mobile asset or event.

10. The method as claimed in claim 9 wherein the more specific data sets include commodity type, shipment type, trailer type, mode, member type, partner, ship location, time period, route, and location.

11. The method as claimed in claim 1 wherein the tracking data comprise discrete attributes selected from the group consisting of loaded time, tractor hook-up, route compliance violation, stop history, unauthorized container entry history, delivery arrival, container opened, container empty and continuous attributes that are continuously measured and updated selected from the group consisting of volume of contents, last reported GPS location and direction, speed, temperature history, and potential late delivery.

12. The method as claimed in claim 11 wherein for a discrete attribute the Owners and Partners can choose to select or not select the attribute and for continuous attributes the Owners and Partners can specify the desired frequency of reporting in time increments or upon the occurrence of selected events.

13. The method as claimed in claim 12 wherein the selected events are selected from the group consisting of container loaded, unauthorized hook-up, pick-up departure, route compliance, temperature excursion, stops, unauthorized container entry, container opened, and container unloaded.

14. The method as claimed in claim 1 further comprising determining the default configuration parameters for a specific mobile asset tracking device to be used during a discrete event to minimize the data and information reported by the mobile asset tracking device while still meeting any and all default data and specified tracking data associated with a discrete event, the Owners and Partners selectively viewing the determined default configuration parameters for the discrete event, selectively over-riding the default configuration for the discrete event by specifying a more extensive set of data and information to be applied to the discrete event, revising the configuration parameters for a specific mobile asset tracking device to be used during a discrete event to meet the more extensive data and information requirements, reconfiguring the mobile asset tracking device by communicating to the mobile asset tracking device the determined and revised configuration parameters for the mobile asset tracking device during the discrete event, the mobile asset tracking device reporting the position and status attributes of the mobile asset and its contents during the discrete event as required by the configuration parameters, wherein at the conclusion of the discrete event the mobile asset tracking device automatically reverts to the default configuration parameters to be used whenever the mobile asset is not in use for a discrete event.

15. The method as claimed in claim 1 further comprising systematically analyzing the position and status data for each discrete event, recording the results of the analysis of the tracking data to a system database, the Owners and Partners contemporaneously searching-out, looking-up, or otherwise accessing and viewing the data and information for specific discrete events, and contemporaneously generating exception reports that list all discrete events associated with the Owners and Partners that satisfy event description attributes or data and information attributes selected by each party.

16. The method as claimed in claim 1 further comprising attributing and allocating costs among the Owners and Partners who are associated with the acquisition, analysis or presentation of data acquired from the mobile asset tracking devices.

17. The method as claimed in claim 16 wherein said attribution and allocation of costs comprises determining and recording for Owners and Partners for a predetermined period of time (a) the count of discrete events for which party's data and information requirements controlled in the determination of the configuration parameters for that event, (b) the count of discrete events for which that party accessed the data record for that discrete event at least once, and (c) the count of exception reports generated by that party, and charging each party proportionately based on the count of events with which they are associated relative to the total count of events.

18. A system for effectuating collaboration on mobile asset tracking between one or more parties that own mobile assets equipped with mobile asset tracking devices ("Owners") and one more other parties with a need to know tracking data for at least one mobile asset and its contents for at least one discrete event ("Partners"), the system comprising:

a) means for at least one Owner and at least one Partner to specify the tracking data required for one or more mobile assets for one or more discrete events, wherein the mobile assets are equipped with remotely configurable mobile asset tracking devices;

b) means for remotely configuring the mobile asset tracking devices to report the specified tracking data;

c) means for acquiring tracking data from the mobile asset tracking devices for one or more discrete events which simultaneously minimizes the quantity of data acquired and satisfies the specified tracking data; and d) means for at least one Owner and at least one Partner to contemporaneously access and view the tracking data.

19. The system as claimed in claim 18 wherein Owners include any party or type of party that has title to, leases or otherwise controls a mobile asset equipped with a mobile asset tracking device and any party or type of party that provides or arranges for mobile asset tracking capability or services on mobile assets including asset-based transportation service providers, non-asset based transportation service providers, and private fleets.

20. The system as claimed in claim 18 wherein Partners include any party or type of party that has a need to know tracking data for mobile assets equipped with a mobile asset tracking device including shippers, consignees, ship locations, freight brokers, third party logistics providers, fourth party logistics providers, custom brokers, freight payment service providers, risk management service providers, equipment service providers that manufacture, sell, lease, or maintains the asset, and regulatory and enforcement parties.

21. The system as claimed in claim 18 wherein the mobile asset may have self-contained power for movement and is selected from the groups of asset types comprising trucks, railroads, ships, vans, shipment containers, trailers, rail cars, shipment boxes for road, rail, or ocean service and machinery.

22. The system as claimed in claim 18 wherein a discrete event is any continuous period between a defined initiation and termination which may be time or events.

23. The system as claimed in claim 22 wherein the discrete event is a shipment defined by the delivery of goods in a container from a ship location where the loading is complete and the container is sealed for the final time to a location where the seal is broken and unloading begins.

24. The system as claimed in claim 18 wherein an Owner can specify the data set to be provided by each mobile asset by first assigning an overall default data set for all trailer types, and the more specific data sets for each trailer type with the capability to override default for an individual mobile asset.

25. The system as claimed in claim 18 wherein an Owner can specify the data set that Partners can access for that Owner's mobile assets by first assigning an overall default data set for all Partners then more specific data sets for each Partner type with the capability to override default setting for an individual Partner.

26. The system as claimed in claim 18 wherein the means for specifying tracking data comprises means for optionally specifying a data set that applies to all mobile assets for all events and further comprises means for optionally specifying more specific data sets each of which applies only to mobile assets and events that meet the values specified for each mobile asset or event.

27. The system as claimed in claim 26 wherein the more specific data sets include commodity type, shipment type, trailer type, mode, member type, partner, ship location, time period, route, and location.

28. The system as claimed in claim 18 wherein the tracking data comprise discrete attributes selected from the group consisting of loaded time, tractor hook-up, route compliance violation, stop history, unauthorized container entry history, delivery arrival, container opened, container empty and continuous attributes that are continuously measured and updated selected from the group consisting of volume of contents, last reported GPS location and direction, speed, temperature history, and potential late delivery.

29. The system as claimed in claim 28 wherein for a discrete attribute Owners and Partners can choose to select or not select the attribute and for continuous attributes the Owners and Partners can specify the desired frequency of reporting in time increments or upon the occurrence of selected events.

30. The system as claimed in claim 29 wherein the selected events are selected from the group consisting of container loaded, unauthorized hook-up, pick-up departure, route compliance, temperature excursion, stops, unauthorized container entry, container opened, and container unloaded.

31. The system as claimed in claim 18 further comprising means for determining the default configuration parameters for a specific mobile asset tracking device to be used during a discrete event to minimize the data and information reported by the mobile asset tracking device while still meeting any and all default data and specified tracking data associated with a discrete event, the Owners or Partners selectively viewing the determined default configuration parameters for the discrete event, selectively over-riding the default configuration for the discrete event by specifying a more extensive set of data and information to be applied to the discrete event, revising the configuration parameters for a specific mobile asset tracking device to be used during a discrete event to meet the more extensive data and information requirements, reconfiguring the mobile asset tracking device by communicating to the mobile asset tracking device the determined and revised configuration parameters for the mobile asset tracking device during the discrete event, the mobile asset tracking device reporting the position and status attributes of the mobile asset and its contents during the discrete event as required by the configuration parameters, wherein at the conclusion of the discrete event the mobile asset tracking device automatically reverts to the default configuration parameters to be used whenever the mobile asset is not in use for a discrete event.

32. The system as claimed in claim 18 further comprising means for systematically analyzing the position and status data for each discrete event, recording the results of the analysis of the tracking data to a system database, the Owners and Partners contemporaneously searching out, looking-up, or otherwise accessing and viewing the data and information for specific discrete events, and contemporaneously generating exception reports that list all discrete events associated with the Owners and Partners that satisfy event description attributes or data and information attributes specified by each party.

33. The system as claimed in claim 18 further comprising means for attributing and allocating the costs among the Owners and Partners who are associated with acquisition, analysis or presentation of tracking data acquired from the mobile asset tracking devices.

34. The system as claimed in claim 33 wherein said means for attributing and allocating costs comprises means for determining and recording for Owners and Partners for a predetermined period of time (a) the count of discrete events for which party's data and information requirements controlled in the determination of the configuration parameters for that event, (b) the count of discrete events for which that party accessed the data record for that discrete event at least once, and (c) the count of exception reports generated by that party, and charging each party proportionately based on the count of events with which they are associated relative to the total count of events.

35. The system as claimed in claim 18 wherein the system is modular in design and the modules include a customer care module, a master data entry and management module, an enter and maintain transactions appointments module, a shipment tracking module, a performance module, a Gainshare incentive program creation and management module, and an account management module.

* * * * *